US009744548B2

(12) United States Patent
Gopalarao et al.

(10) Patent No.: US 9,744,548 B2
(45) Date of Patent: Aug. 29, 2017

(54) TELESCOPING SPRAY WAND ASSEMBLY

(71) Applicant: The Fountainhead Group, Inc., New York Mills, NY (US)

(72) Inventors: Sudhindra Belur Gopalarao, New Hartford, NY (US); Jeffrey Spooner, West Winfield, NY (US); Collin R. Blank, New Hartford, NY (US)

(73) Assignee: THE FOUNTAINHEAD GROUP, INC., New York Mills, NY (US)

( * ) Notice: Subject to any disclaimer, the term of this patent is extended or adjusted under 35 U.S.C. 154(b) by 58 days.

(21) Appl. No.: 14/623,684

(22) Filed: Feb. 17, 2015

(65) Prior Publication Data
US 2016/0236224 A1   Aug. 18, 2016

(51) Int. Cl.
*B05B 15/06* (2006.01)
*A01G 25/14* (2006.01)
*B05B 1/14* (2006.01)
*B05B 1/30* (2006.01)
*B05B 9/01* (2006.01)
(Continued)

(52) U.S. Cl.
CPC ............ *B05B 15/064* (2013.01); *A01G 25/14* (2013.01); *B05B 1/005* (2013.01); *B05B 1/14* (2013.01); *B05B 1/3066* (2013.01); *B05B 9/01* (2013.01); *B05B 12/002* (2013.01); *B05B 15/068* (2013.01)

(58) Field of Classification Search
CPC ....... B05B 15/064; B05B 1/14; B05B 1/3066; B05B 1/005; B05B 12/002; B05B 5/02; B05B 15/068; B05B 9/01; A01G 25/14

USPC .......................... 239/532, 530, 525, 526, 281
See application file for complete search history.

(56) References Cited

U.S. PATENT DOCUMENTS 1,117,228 A * 11/1914 Overbeke ............. B05B 7/2445
                                                      239/313
1,769,944 A *  7/1930 Crisp ..................... F28G 3/163
                                                      15/317

(Continued)

OTHER PUBLICATIONS

Choosing your Backpack Sprayer; Solo USA; May 6, 2014; http://www.solousa.com/store/browse/backpack_sprayers.html.
(Continued)

*Primary Examiner* — Arthur O Hall
*Assistant Examiner* — Steven M Cernoch
(74) *Attorney, Agent, or Firm* — Bond Schoeneck & King, PLLC; George McGuire

(57) ABSTRACT

The invention provides a telescoping wand assembly for use in dispensing liquid from a container, including a trigger module extending along a longitudinal axis between proximal and distal ends. The trigger module includes a tubular handle member, a user accessible trigger positioned externally of the tubular handle member that is selectively movable between first and second positions, a hose positioned within the tubular handle member and adapted to transport liquid from the container, and a valve actuating member that is selectively, movably actuable by movement of the trigger between its first and second positions. A stationary frame assembly provides rigidity and contact points for a telescopically movable tube assembly that extends from the trigger module. A shut-off valve and nozzle are positioned at the distal end of the wand assembly and movement of the shut-off valve is controlled by the trigger and translated by way of the tube assembly.

14 Claims, 11 Drawing Sheets

(51) Int. Cl.
  *B05B 12/00* (2006.01)
  *B05B 1/00* (2006.01)

(56) References Cited

U.S. PATENT DOCUMENTS

| | | | | |
|---|---|---|---|---|
| 1,906,621 A | * | 5/1933 | Knuth | B05B 15/10 |
| | | | | 239/204 |
| 2,699,216 A | * | 1/1955 | Alden | A62C 31/005 |
| | | | | 169/43 |
| 3,727,841 A | * | 4/1973 | Hengesbach | A01G 25/02 |
| | | | | 239/145 |
| 3,915,382 A | * | 10/1975 | Davis | B05B 15/064 |
| | | | | 239/195 |
| 4,525,999 A | * | 7/1985 | Inman | F15B 15/16 |
| | | | | 239/265.19 |
| 4,682,734 A | * | 7/1987 | Proctor | B01F 5/0496 |
| | | | | 137/564.5 |
| 4,858,830 A | * | 8/1989 | Proctor | A01M 7/0046 |
| | | | | 239/313 |
| 5,050,802 A | | 9/1991 | Gill | |
| 5,082,185 A | | 1/1992 | Evans | |
| 5,100,055 A | | 3/1992 | Rokitenetz et al. | |
| 5,799,835 A | * | 9/1998 | Gobbel | B05B 15/064 |
| | | | | 222/174 |
| 6,364,219 B1 | * | 4/2002 | Zimmerman | F41B 9/0012 |
| | | | | 222/79 |
| 6,422,485 B1 | | 7/2002 | Hsu | |
| 6,446,884 B1 | | 9/2002 | Utter | |
| 6,669,113 B2 | | 12/2003 | Halle | |
| 6,905,080 B2 | * | 6/2005 | Pohorecki | B08B 3/026 |
| | | | | 239/280 |
| 7,051,959 B2 | | 5/2006 | Lim | |
| 7,673,910 B2 | * | 3/2010 | Moon | B05B 15/064 |
| | | | | 239/532 |
| 8,136,744 B2 | * | 3/2012 | Gerard | A62C 31/28 |
| | | | | 239/159 |
| 2004/0011886 A1 | | 1/2004 | Lawson | |
| 2006/0016913 A1 | * | 1/2006 | Lo | B05B 1/1636 |
| | | | | 239/532 |
| 2008/0304922 A1 | * | 12/2008 | Moon | B05B 15/064 |
| | | | | 406/196 |
| 2012/0248224 A1 | | 10/2012 | Jones | |
| 2014/0110492 A1 | | 4/2014 | Cooper | |

OTHER PUBLICATIONS

Ray Padula Comfi-Rain Thumb-Controlled Telescoping Water Wand; Meijer; May 2, 2014; http://meijer.com/s/ray-padula-comfi-rain-thumb-controlled-telescoping-water-wand/_/R-128992.
Speedway Professional Duty Gravity Feed Spray Gun; The Home Depot; May 6, 2014; http://www.homedepot.com/p/SPEEDWAY-Professional-Duty-Gravity-Feed-Spray-Gun-9410/202510311#specifications.
The Rumford Gardener SP1025 Telescoping Watering Wand with Adjustable Multi-Pattern Head; Amazon.com; May 2, 2014; http://amazon.com/The-Rumford-Gardener-SP1025-Multi-Pattern/dp/B0030EG28M.
Canadian Patent Application Serial No. 2,920,925, Office Action dated Feb. 15, 2017, pp. 1-4.

* cited by examiner

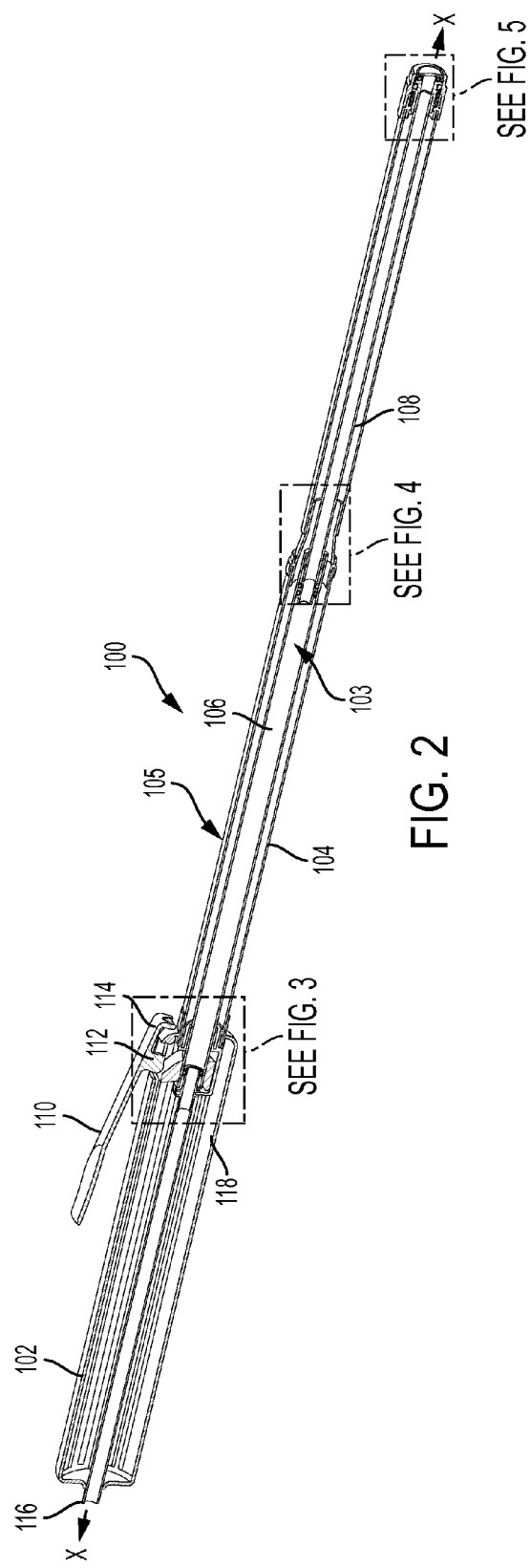

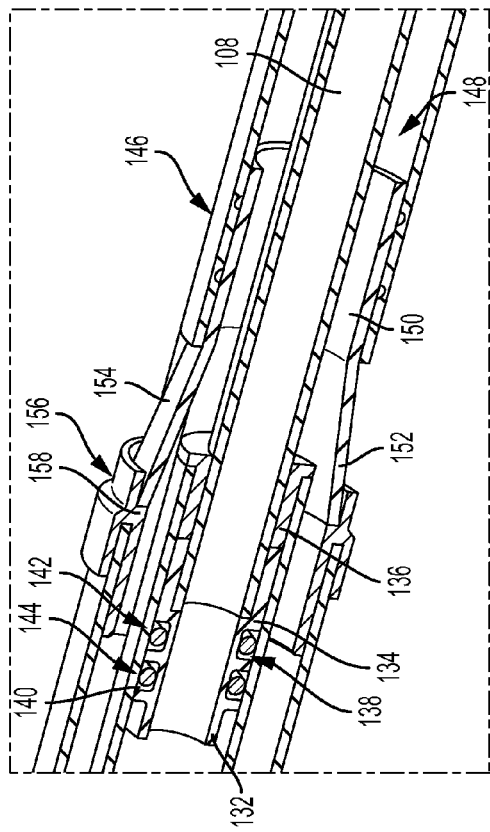
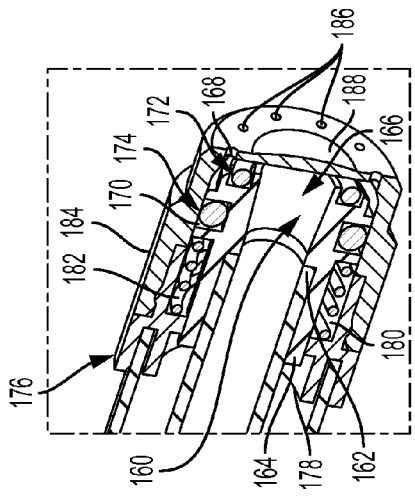
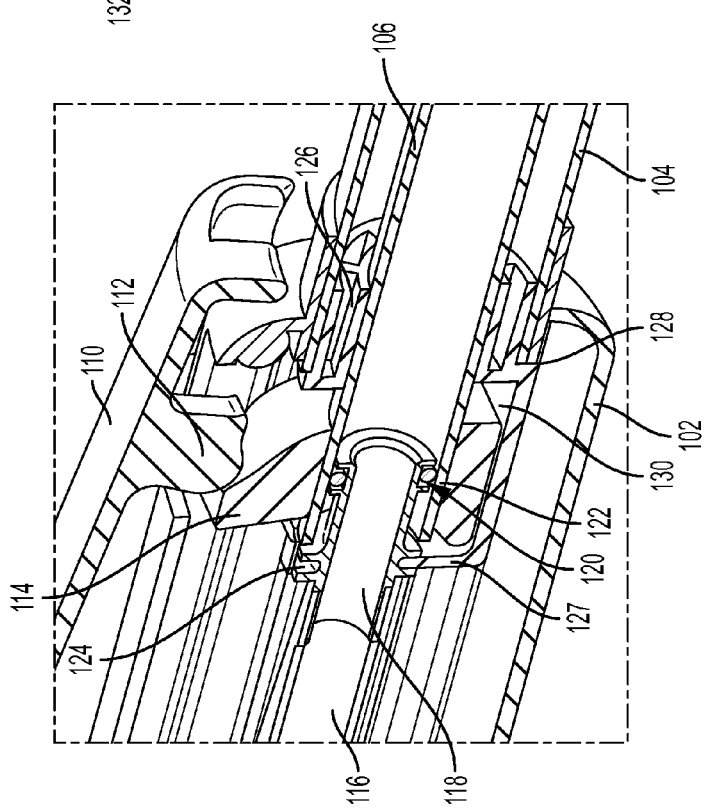
FIG. 4
FIG. 5
FIG. 3

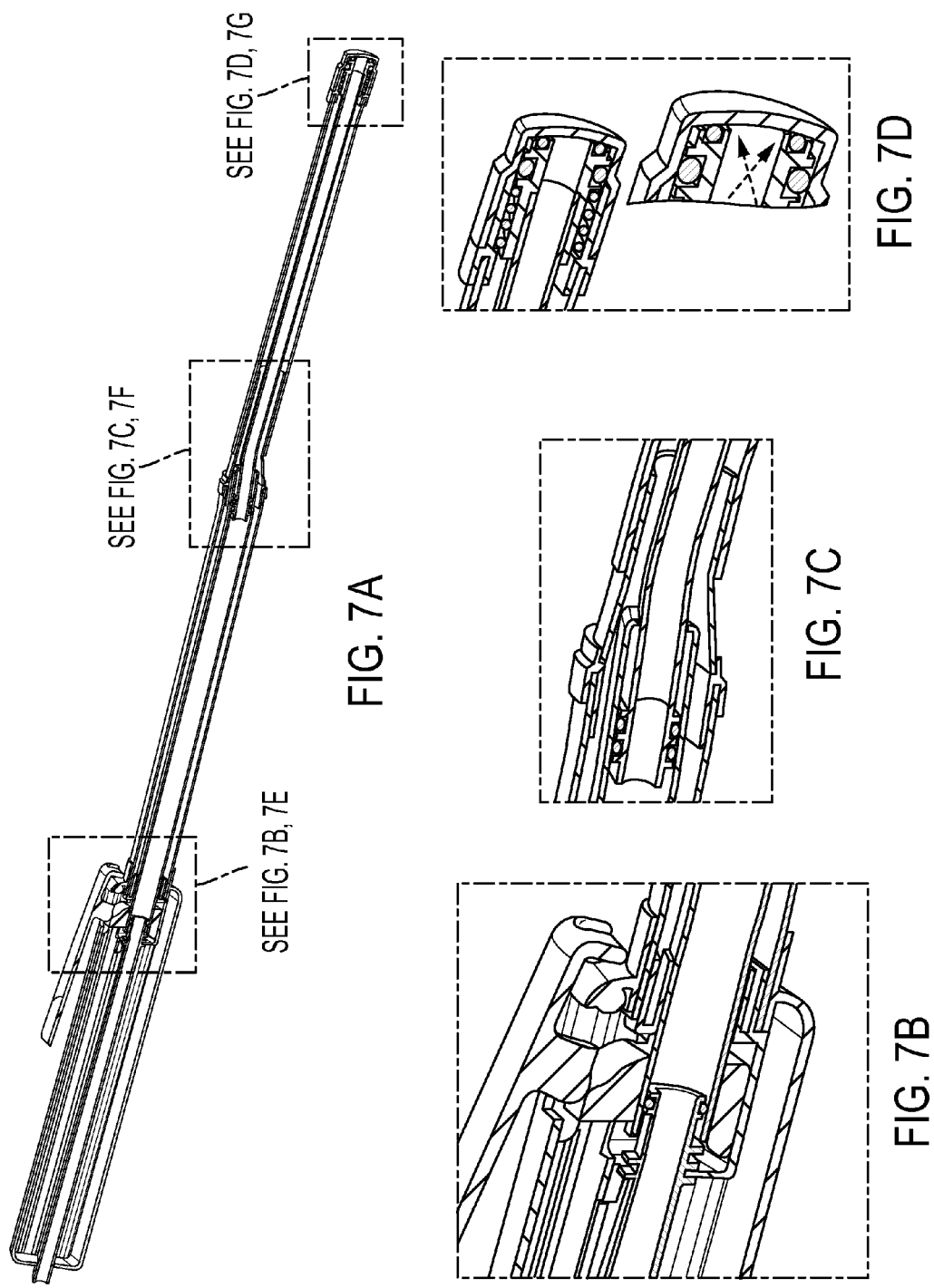

FIG. 8A(1)

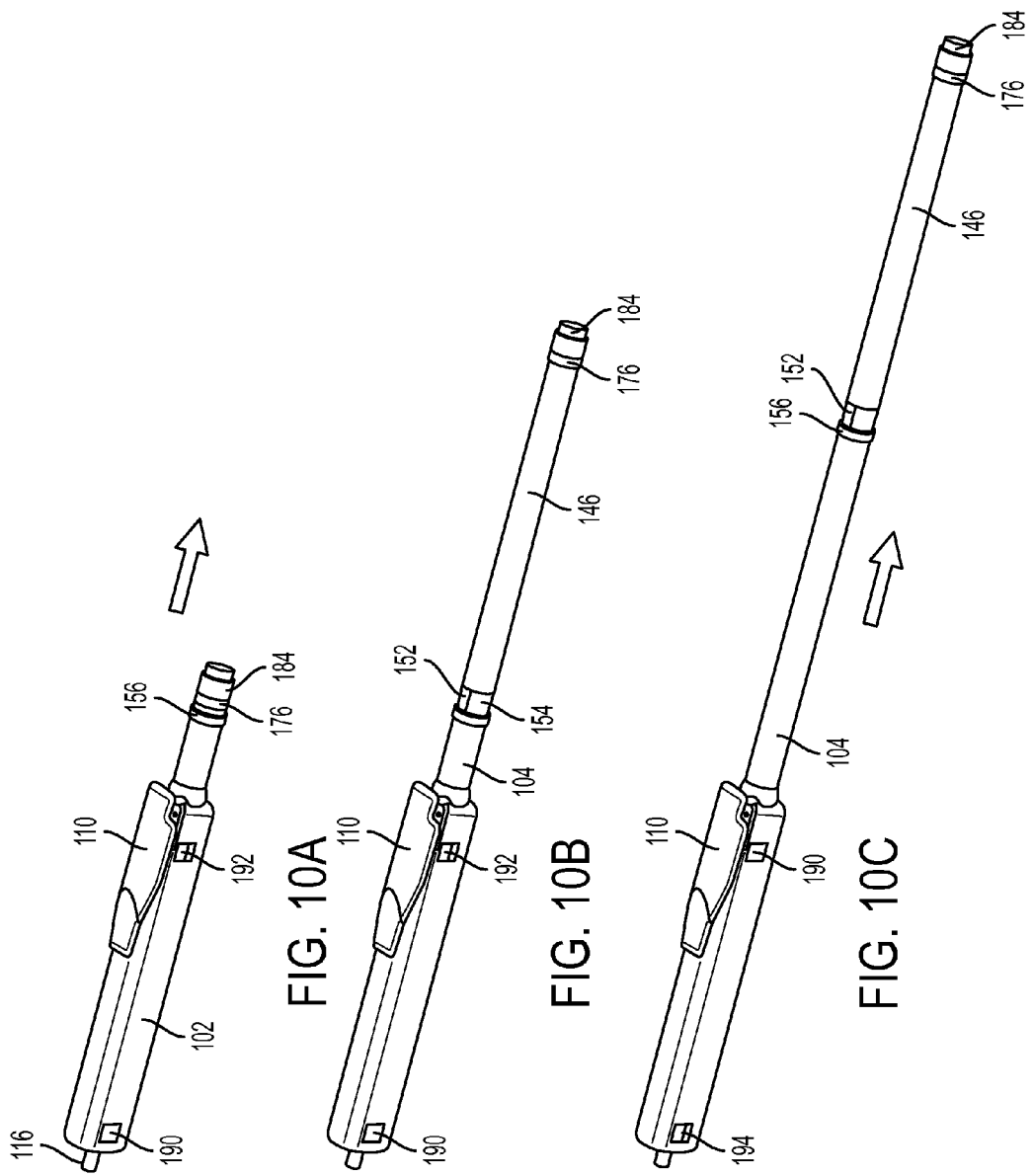

TELESCOPING SPRAY WAND ASSEMBLY

REFERENCE TO RELATED APPLICATION

N/A

BACKGROUND

1. Field of Invention

The present invention relates to sprayers, and more particularly to sprayers having a collapsible spray wand.

2. Background of Art

Lawn and garden sprayers often employ a folding or telescoping wand in order to save space for both store packaging and subsequent convenient handling and storage by the user. The wand is unfolded or extended during its use in order to apply product at a distance without the user needing to bend over or reach too far.

A disadvantage of folding and telescoping wands is that the chemical fluid remaining in the wand is discharged out of the nozzle when it is moved from its extended to its collapsed position. This occurs because the volume of fluid in the wand, contained between the handle and shut-off valve and nozzle, is displaced out through the nozzle as one section of the wand is collapsed into or folded over the next. This discharge of fluid can create a health hazard as the user may come into contact with the chemical fluids, and leave a mess as the fluid can drip onto garage floors or other unintended areas.

OBJECTS AND ADVANTAGES

It is a principal object and advantage of the present invention to provide a telescoping wand assembly that may be moved between collapsed and extended positions without expelling fluid.

It is another object and advantage of the present invention to provide a safe and functional means for extending the wand to a desired overall length for spraying, and for collapsing the wand to a convenient length for storage.

Other objects and advantages of the present invention will in part be obvious and in part appear hereinafter.

SUMMARY OF THE INVENTION

In accordance with the foregoing objects and advantages, the present invention provides a wand that is movable between collapsed and extended positions. When in the fully extended position, fluid may freely flow through the wand and be dispensed upon an area of interest through manual depression of a trigger. When moved from its fully extended to fully collapsed positions, a shut-off valve and O-ring assembly seals the nozzle of the wand and prevents liquid from leaking from the wand. Likewise, when in the fully extended position and the trigger is not depressed, the shut-off valve and O-ring assembly seals the nozzle and prevents the passage of liquid from the wand assembly.

In one aspect, the invention provides a telescoping wand assembly for use in dispensing liquid from a container, comprising: a trigger module extending along a longitudinal axis between proximal and distal ends and comprising a tubular handle member, a user accessible trigger positioned externally of the tubular handle member and selectively movable between first and second positions, a hose positioned within the tubular handle member and adapted to transport liquid from the container, and a valve actuating member that is selectively, movably actuable by movement of the trigger between its first and second positions. The assembly further comprises a tube assembly interconnected to the handle member consisting of a first tube interconnected to the handle member and comprising opposing first and second ends and a predetermined internal cross-sectional dimension; a second tube positioned co-axially within the first tube and in fluid communication with the hose and comprising first and second ends and a predetermined external cross-sectional dimension that is less than the predetermined internal cross-sectional dimension of the first tube with a cross-sectional gap defined there between; and a third tube coupled in sealed relation to and in fluid communication with the second tube wherein the third tube is selectively slidably movable along the longitudinal axis towards and away from the trigger module. The assembly further comprises a nozzle in fluid communication with the third tube; and a valve positioned between the third tube and the nozzle and in spring biased relation to the nozzle for selective movement between a first position wherein the nozzle is sealed relative to the third tube and a second position wherein the nozzle is in fluid communication with the third tube, whereby selective movement of the trigger between its first and second positions causes the valve to move between its first and second positions, respectively.

In one embodiment, the telescoping wand assembly further comprises a sheath extending co-axially from the first tube and in surrounding relation to the third tube. The sheath and the third tube are each slidably movable along said longitudinal axis towards and away from the trigger module.

In an embodiment, the telescoping wand assembly further comprises a coupler tube that couples the second tube to the third tube and comprises a first end positioned within the second tube and a second engaging the third tube. The telescoping tube assembly further comprises a coupler stop tube positioned adjacent the second end of said coupler tube and in circumferentially surrounding relation to the third tube. The coupler tube is positioned in fluid communication with the third tube.

In an embodiment, the telescoping wand assembly further comprises a first sealing mechanism positioned in sealed relation between the coupler tube and the second tube in a position adjacent the first end of the coupler tube. The telescoping wand assembly further comprises a second sealing mechanism positioned between the coupler tube and the second tube in spaced relation to the first sealing mechanism.

In an embodiment, the wand assembly further comprises a tube lock that includes a tang defined by at least one longitudinally extending slot formed through said tube lock, said at least one longitudinally extending slot being positioned in communication with said first tube and said third tube.

In an embodiment, the gap is annular in cross-section.

In an embodiment, the valve actuating assembly, the first tube, and said second tube each are movable along the longitudinal axis between fully retracted and fully extended positions. The telescoping wand assembly further comprises a first position lock integrated with the tubular handle, wherein the valve actuating assembly engages the position lock when in its fully retracted position. The telescoping wand assembly further comprises a second position lock integrated with the tubular handle, wherein said valve actuating assembly engages the position lock when in its fully extended position.

BRIEF DESCRIPTION OF THE DRAWINGS

The present invention will be more fully understood and appreciated by reading the following Detailed Description in conjunction with the accompanying drawings, in which:

FIG. 2 is a cross-sectional view taken along line 2-2 of FIG. 1B;

FIG. 3 is an enlarged view taken along section 3-3 of FIG. 2;

FIG. 4 is an enlarged view taken along section 4-4 of FIG. 2;

FIG. 5 is an enlarged view taken along section 5-5 of FIG. 2;

FIG. 7A is a cross-sectional view taken along line 7A-7A of FIG. 6A;

FIG. 7B is an enlarged view taken along section 7B/E-7B/E of FIG. 7A;

FIG. 7C is an enlarged view taken along section 7C/F-7C/F of FIG. 7A;

FIG. 7D is an enlarged view taken along section 7D/G-7D/G of FIG. 7A;

FIG. 8A(1) is an enlarged view taken at section 8A(1)-8A(1) of FIG. 8A;

FIG. 10A is a perspective views of a telescoping wand assembly retracted to its fully retracted position;

FIG. 10B is a perspective views of a telescoping wand assembly extended to its middle extended position;

FIG. 10C is a perspective views of a telescoping wand assembly extended to its fully extended position.

DETAILED DESCRIPTION

Figure 1A:
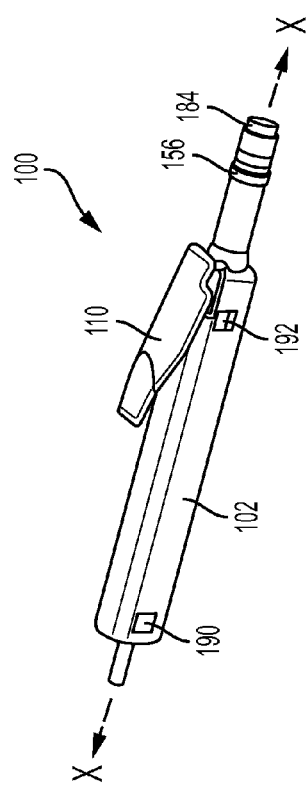
FIGS. 1A and 1B are perspective views of a telescoping wand assembly in fully collapsed and fully extended positions, respectively.
Figure 1B:
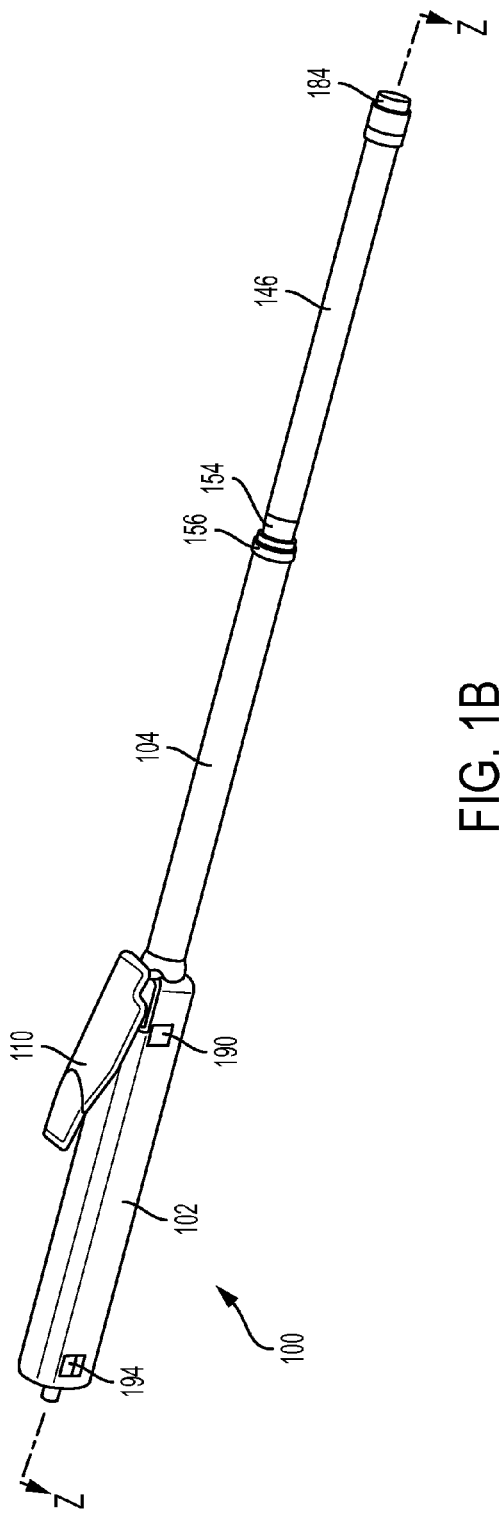
Figure 6A:
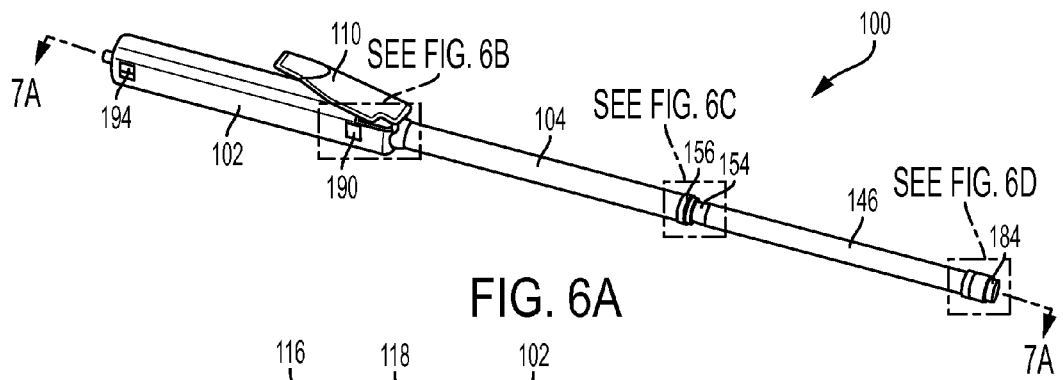
FIG. 6A is a perspective views of a telescoping wand assembly in fully extended position.
Figure 6B:
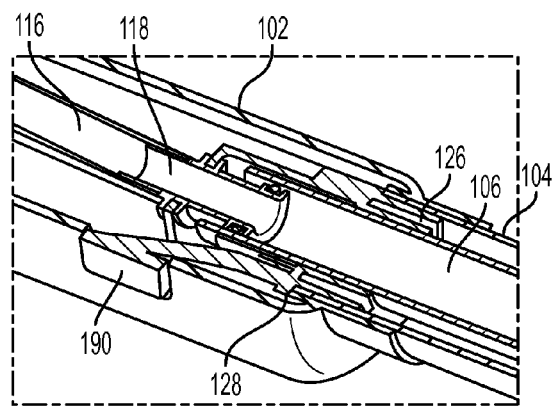
FIG. 6B is an enlarged view taken along section 6B-6B of FIG. 6A.
Figure 6C:
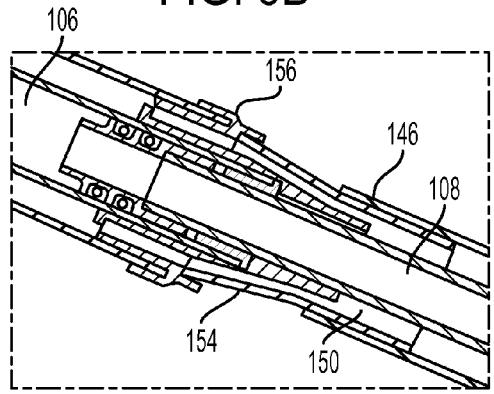
FIG. 6C is an enlarged view taken along section 6C-6C of FIG. 6A.
Figure 6D:
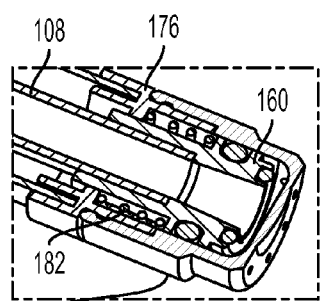
FIG. 6D is an enlarged view taken along section 6D-6D of FIG. 6A.
Figure 7G:
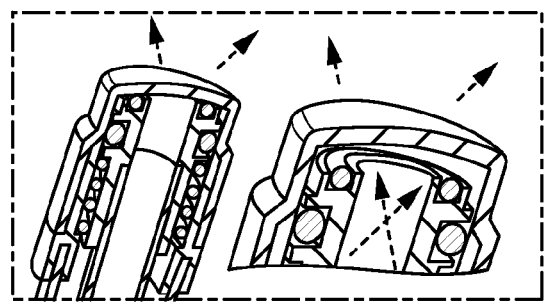
FIG. 7G is an enlarged view taken along section 7D/G-7D/G of FIG. 7A.
Figure 7F:
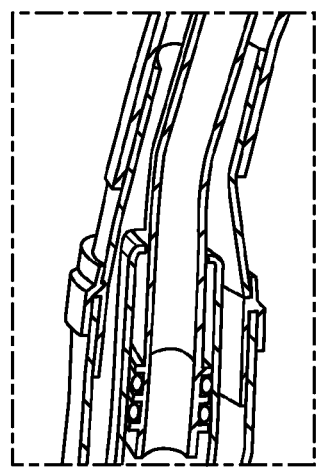
FIG. 7F is an enlarged view taken along section 7C/F-7C/F of FIG. 7A.
Figure 7E:
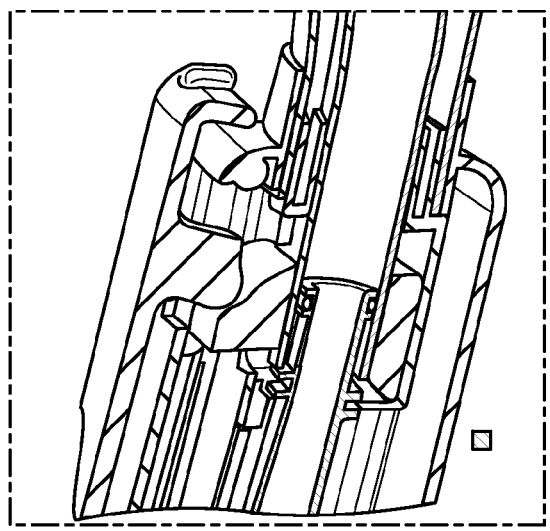
FIG. 7E is an enlarged view taken along section 7B/E-7B/E of FIG. 7A
Figure 8A:
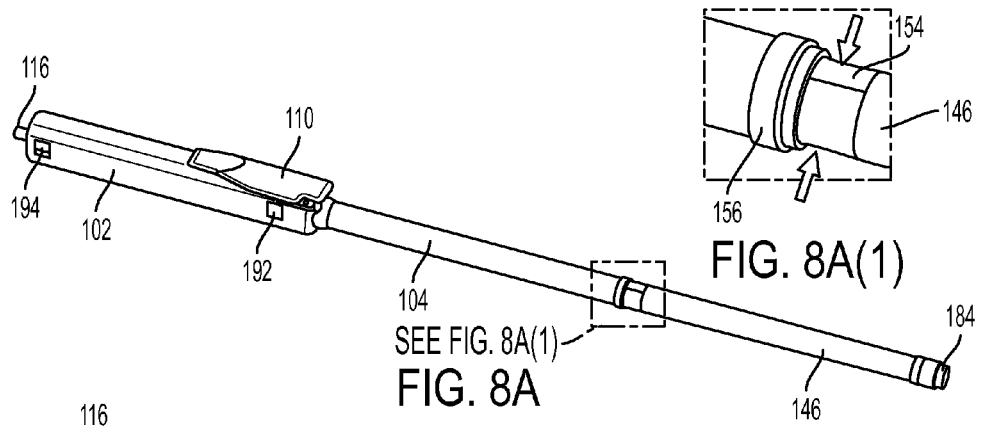
FIG. 8A is a perspective views of a telescoping wand assembly in fully extended position when initially being retracted.
Figure 8B:
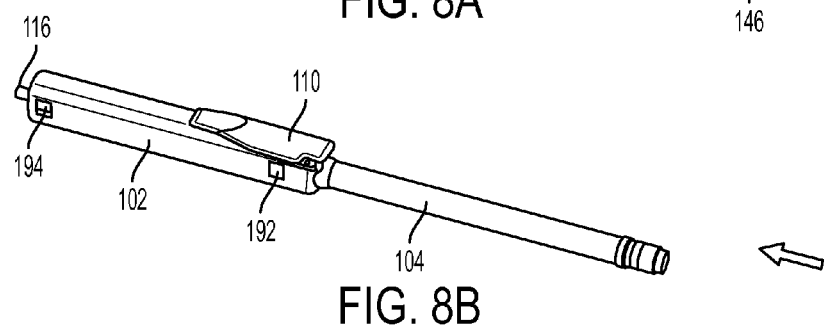
FIG. 8B is a perspective views of a telescoping wand assembly retracted to its middle retracted position.
Figure 8C:
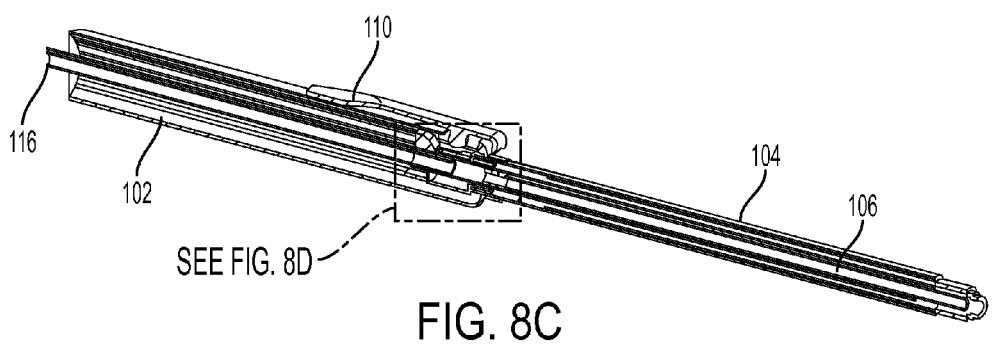
FIG. 8C is a cross-section view taken along section line 8C-8C of FIG. 8B.
Figure 8D:
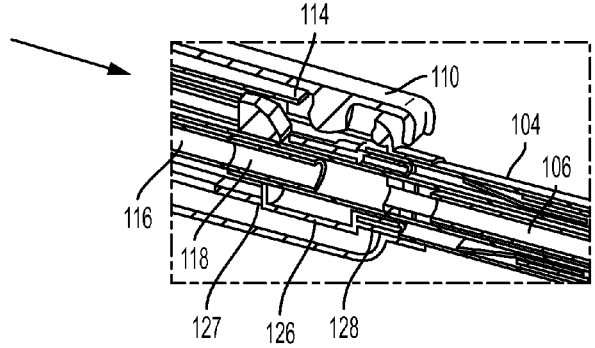
FIG. 8D is a enlarged view taken along section 8D-8D of FIG. 8C.
Figure 9A:
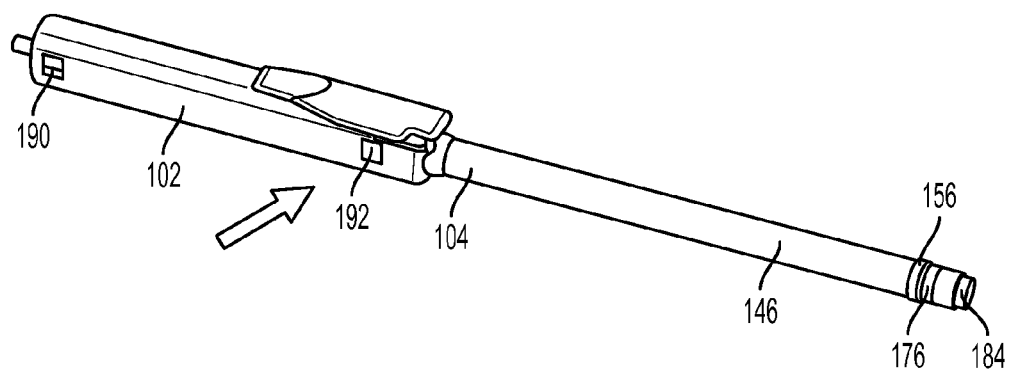
FIG. 9A is a perspective views of a telescoping wand assembly retracted to its middle retracted position.
Figure 9B:
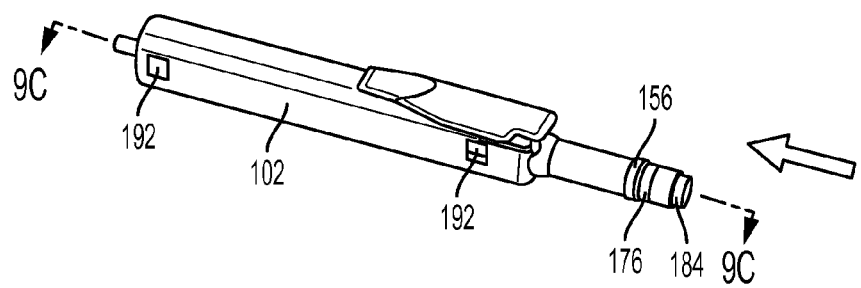
FIG. 9B is a perspective views of a telescoping wand assembly retracted to its fully retracted position
Figure 9C:
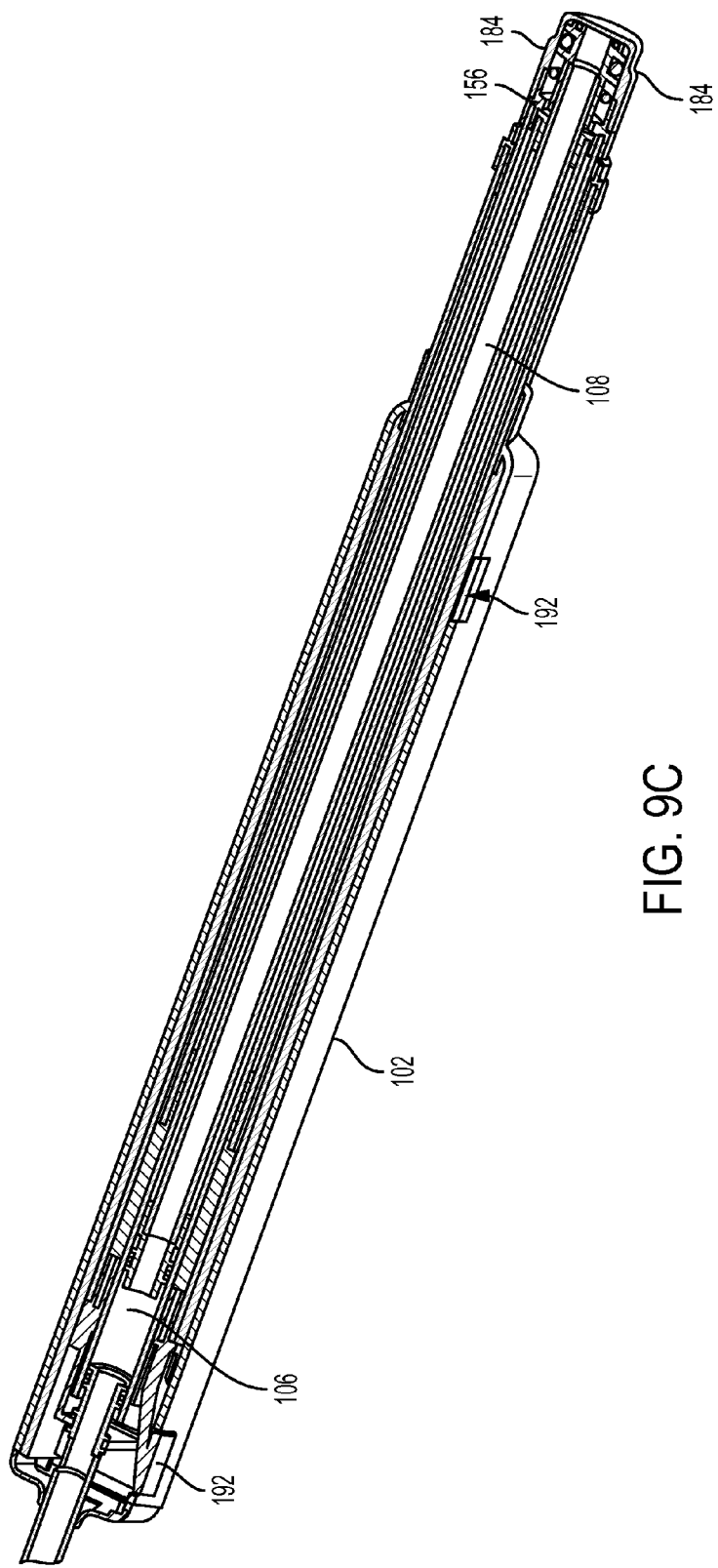
FIG. 9C is a cross-section view taken along section line 9C-9C of FIG. 9B.
Figure 11A:
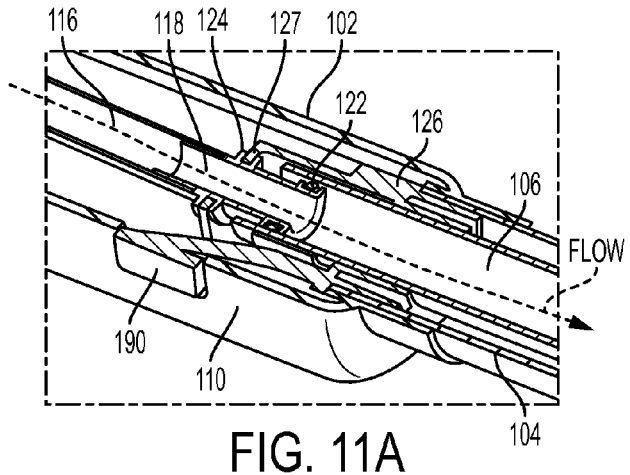
FIGS. 11A-B are partial cross-section views showing details of the hose connector.
Figure 11B:
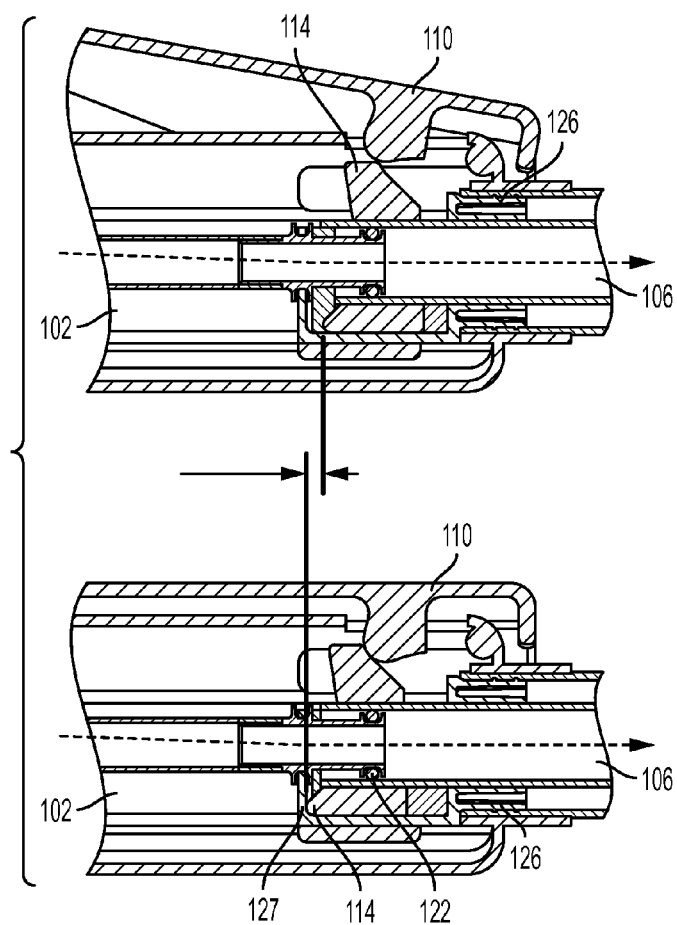

Referring now to the drawings, in which like reference numerals refer to like parts throughout, there is seen in FIGS. 1A and 1B a spray wand, designated generally by reference numeral 100, for use in spraying fluid, such as pesticide, herbicide, or other fluid. Spray wand 100 includes telescoping sections that permit it to be used when in a fully extended position or conveniently stowed when in a fully collapsed position. Advantageously, spray wand 100 minimizes any expulsion of any residual fluid that is contained within the wand sections when moved from its fully extended to its fully collapsed positions.

Before describing the functionality of spray wand 100, its various structural components will be identified and described. In general, spray wand 100 comprises a handle 102, a tube assembly 103, and a structural framework 105. More specifically, and with reference to FIG. 2, spray wand 100 extends along a longitudinal axis X-X and essentially comprises an elongated handle section 102, an outer tube 104 and middle tube 106 that, when in their fully extended position, each co-linearly extend from the distal end of handle 102, and an inner tube 108 that co-linearly extends from outer tube 104. In its fully collapsed state, inner tube 108 telescopically fits within middle tube 106 which in turn telescopically fits within outer tube 104, and outer tube 104 telescopically fits within handle section 102. A trigger 110 pivotally mounted to handle section 102 includes a cam 112 that extends through handle section 102 and engages a cam follower 114 longitudinally movably housed within handle section 102. Manual movement of trigger 110 causes longitudinal displacement of cam follower 114 which in turn moves tube assembly 103, thereby opening a fluid passageway that permits fluid to flow through and be expelled from wand 100, as will be explained in greater detail hereinafter.

A hose 116 longitudinally extends through the proximal end of handle section 102 and is contained there within by a cylindrical hose connector 118 which fluidly interconnects hose 116 to middle tube 106. The hose 116 extends into a fluid filled container and serves to transport the fluid, via gravity (although a pump could be employed), from the container to middle tube 106 which then transports the fluid to inner tube 108 and for ultimately dispensing onto the surface/substance to be treated with the fluid.

Hose connector 118 extends partially within middle tube 106 and includes a circumferential groove 120 formed there around adjacent its distal end and within middle tube 106. An O-ring 122 (or other sealing mechanism/substance) is securely positioned within groove 120 and sandwiched between the inner wall of middle tube 106 and hose connector 118. Thus, when the liquid passes through hose connector 118 and into middle tube 106, O-ring 122 will prevent the fluid from leaking rearward and into handle 102. Additional grooves and O-rings could be added for further sealing if deemed necessary based on the intended use of sprayer 100.

Hose connector 120 further comprises a circumferential groove 124 at an intermediate point there along and positioned adjacent and in abutting relation to the exterior of middle tube 106. An outer tube housing 126 is partially positioned in the annular groove formed between the outer surface of middle tube 106 and the inner surface of outer tube 104. The proximal end 127 of outer tube housing 126 is positioned within groove 124 to securely hold it in position. A shoulder 128 is formed adjacent the distal end of outer tube housing 126 and the proximal end of outer tube 104 abuts shoulder 128 and is sandwiched between the inner surface of handle 102 and the portion of outer tube housing 126 that extends from shoulder 128 to its distal end.

Cam follower 114 is contained within a cavity 130 formed at an intermediate position along outer tube housing 126. As trigger 110 is manually moved from its neutral position to its active position, a spring is compressed and cam 112 engages the ramped surface of cam follower 114, thereby moving/pushing cam follower 114 longitudinally proximally. Cam follower 114, in turn, ultimately engages outer tube assembly 103 pushing it proximally as well. As will be explained in greater detail hereinafter, the longitudinal proximal movement of cam follower 114 pulls middle tube 106 which in turn pulls inner tube 108 distally as well. This proximal movement of the tube assembly 103 opens a nozzle permitting the dispersion of liquid from spray wand 100. When the trigger 110 is released and allowed to return to its neutral position, the spring (which will be described in greater detail hereinafter) decompresses and causes the longitudinal and distal movement of middle tube 106 and inner tube 108, also resulting in the closing of the nozzle. This operation will be explained in greater detail after further describing the structure of spray wand 100.

With reference to FIG. 4, the junction of middle tube 106 and inner tube 108 is shown. A tube coupler 132 interconnects middle tube 106 in which it is entirely positioned and inner tube 108. The exterior surface of tube coupler 132 slides via O-rings against the inner surface of middle tube 106 and the outward surface of inner tube 108 is assembled into the interior of tube coupler 132. More specifically, a shoulder 134 is formed in the interior of tube coupler 132 and inner tube's proximal end abuts shoulder 134. In addition, a flanged coupler tube stop 136 is press fit into the distal end of middle tube 106 until its flanged end abuts the distal end of middle tube 106. Tube coupler 132 further comprises a pair of longitudinally spaced, circumferentially formed grooves 138, 140 positioned proximally from shoulder 134, and in which O-rings 142, 144, respectively, are positioned, to prevent leaking of any fluid that passes through middle tube 106 to inner tube 108.

To help protect the structural integrity of inner tube 108, and provide structure to the overall wand 100, a protective sheath 146 is positioned in co-linearly extending relation to and around inner tube 108 with an annular gap 148 positioned there between. Sheath 146 is of an outer diameter that is smaller than the inner diameter of outer tube 104 and an inner diameter that is larger than the outer diameter of middle tube 106, thereby permitting it to telescope into outer tube 104 and permit middle tube 106 to fit there within.

A tube lock 150 is positioned in a portion of the annular gap 148 between sheath 146 and inner tube 108. A tang 152 with outwardly biased fingers 154 extends proximally from tube lock 150 and into the gap between outer tube 104 and middle tube 106. Fingers 154 are manually movable towards the center-line of wand 100 and, as explained hereinafter, when depressed will permit sheath 146 and inner tube 108 to be telescopically slid proximally into outer tube 104 and middle tube 106, respectively.

A tube lock retainer 156 is mounted to the distal end of outer tube 104 and includes a flanged surface 158 that serves as an abutment to fingers 154 when in their neutral state and which prevent proximal movement of sheath 146 (and, indirectly, inner tube 108). It is the manual movement of fingers 154 to a position unimpeded by flanged surface 158 that permits the proximal movement of sheath 146 and, indirectly, inner tube 108.

Referring to FIG. 5, the final components comprising wand 100 are shown. More specifically, a shutoff valve 160 is positioned at the distal end of inner tube 108 and includes a shoulder 162 that abuts the distal end of inner tube 108, a legged extension 164 that extends over and is attached to the outer surface of inner tube 108, a fluid passage 166 that continues from inner tube 108, an annular groove 168 that extends around the distal end of valve 160 and a second annular groove 170 that extends circumferentially and exteriorly around passage 166. O-rings 172 and 174 are positioned within grooves 168 and 170, respectively. A nozzle retainer 176 is mounted over the distal end of sheath 146 and includes a flange 178 that presses against and acts as a guide for the outer surface of the legged extension 164 of shutoff valve 160, and together with shutoff valve 160 defines an annular gap 180 in which a spring 182 is positioned. Spring 182 biases shutoff valve 160 towards the distal end of wand 100 and forces it into sealed relation with a nozzle 184 that is positioned at the distal-most position of wand 100 and extends over shutoff valve 160 and nozzle retainer 176. Nozzle 184 comprises a series of openings 186 in circumferentially spaced relation around its distal end surface 188 which is otherwise closed. Spring 182 biases shutoff valve 160 (and O-ring 172) into sealed relation with nozzle 184 preventing fluid from expelling through nozzle 184. When trigger 110 is manually depressed, as will be explained in greater detail hereinafter, shutoff valve 160 is pulled proximally which permits fluid to flow through inner tube 108 and out of nozzle 184.

One final structural component of wand 100 is seen in FIGS. 1A and 1B and comprises a button 190 that protrudes through an opening 192 formed through handle 102 adjacent the distal end thereof when wand 100 is in its fully extended position. To collapse wand 100, a user would depress button 190 and then, after also depressing fingers 154, slide sheath 146, inner tube 108, middle tube 106 and outer tube 104 all proximally. This will cause button 190 to slide within handle 102 towards an opening 194 formed at the proximal end of handle 102 and then pop through opening 194 when the assembly is fully collapsed, thereby locking wand 100 in its collapsed position.

To operate wand 100, it must be in its fully extended position. When fully extended, button 190, as mentioned above, pops through opening 192, fingers 154 bias outward and are prevented from proximal movement by tube lock retainer 156 and the entirety of components are locked in position. To pull liquid through hose 116, trigger 110 is pressed downwardly towards handle 102. When handle 110 is depressed, the cam 112 on trigger 110 engages and pushes proximally on cam follower 114. The proximal movement of cam follower 114, in turn, pulls middle tube 106 proximally. The components linking middle 106 to inner tube 108 (coupler tube 132 and coupler tube stop 136) translate the proximal movement of middle tube 106 to inner tube 108. The proximal movement of inner tube 108, in turn, pulls shut-off valve 164 proximally as well, thereby permitting the fluid to pass through openings 186 formed in nozzle 184. Releasing trigger 110 causes the movable components to move distally via spring return and shut-off valve 186 to seat against the body 188 of nozzle 184 with O-ring 172 sealing off liquid from openings 186. It is worth noting that O-ring 174 also provides sealing as shut-off valve 186 operates.

Wand 100 is collapsed in two stages: middle position retraction and full retraction. To collapse wand 100 to middle position retraction, fingers 154 are pressed inwardly and out of engagement with tube lock retainer 156 and inner tube 108 is slid proximally telescopically moving within middle tube 106 via retraction of the nozzle/sheath assembly. Once this refraction is initiated, cam feature 112 on trigger 110 separates from cam follower 114 such that shut-off valve 160 remains closed; the user is only able to open shut-off valve 160 via trigger 110 when wand 100 is fully extended. Retraction to the middle position is complete when the end face of nozzle retainer 176 abuts tube lock retainer 156.

From this middle position, full retraction may be initiated by the user depressing button 190 out of engagement with opening 192 which releases outer tube 104 (and its assembled components) from its fixed position permitting proximal sliding movement thereof into handle 102. Full retraction is completed by pushing nozzle 184 proximally until button 190 engages opening 194 at which point the components are locked in their collapsed positions.

Referring to FIGS. 10A-10C, like the two stage retraction, extension is also accomplished in two phases: middle position extension and full extension. Extension from the fully collapsed position to the middle phase extension is achieved by distally sliding nozzle 184 and inner tube 108 (which indirectly follows nozzle 184) until the fingers 154 latch against tube lock retainer 156 (see FIG. 10B). Continued extension from the middle position to full extension is initiated by depressing button 190 out of engagement with opening 194 and distally sliding outer tube 104 (or alternatively sheath 146 which will pull the other components along with it) until button 190 engages opening 192 at the distal end of handle 102, thereby locking the assembly in its fully extended and operable position.

What is claimed is:

1. A telescoping wand assembly for use in dispensing liquid from a container, comprising:
    a) a trigger module extending along a longitudinal axis between proximal and distal ends and comprising a tubular handle member, a user accessible trigger positioned externally of said tubular handle member and selectively movable between first and second positions, a hose positioned within said tubular handle member and adapted to transport liquid from the container, and a valve actuating member that is selectively, movably actuable by movement of said trigger between its first and second positions;
    b) a tube assembly interconnected to said handle member
    c) a first tube interconnected to said handle member and comprising opposing first and second ends and a predetermined internal cross-sectional dimension;
    d) a second tube positioned co-axially within said first tube and in fluid communication with said hose and comprising first and second ends and a predetermined external cross-sectional dimension, wherein said predetermined external cross-sectional dimension is less than said predetermined internal cross-sectional dimension of said first tube with a cross-sectional gap defined there between;
    e) a third tube coupled in sealed relation to and in fluid communication with said second tube wherein said third tube is selectively slidably movable along said longitudinal axis towards and away from said trigger module;
    f) a nozzle in fluid communication with said third tube; and
    g) a valve mechanically linked to said first tube and positioned between said third tube and said nozzle and in spring biased relation to said nozzle for selective movement between a first position wherein said nozzle is sealed relative to said third tube and a second position wherein said nozzle is in fluid communication with said third tube, whereby selective movement of said trigger between its first and second positions causes said first tube to longitudinally move which in turn causes said valve to move between its first and second positions, respectively.

2. The telescoping wand assembly according to claim 1, further comprising a sheath extending co-axially from said first tube and in surrounding relation to said third tube.

3. The telescoping wand assembly according to claim 2, wherein said sheath and said third tube are each slidably movable along said longitudinal axis towards and away from said trigger module.

4. The telescoping wand assembly according to claim 1, further comprising a coupler tube that couples said second tube to said third tube and comprises a first end positioned within said second tube and a second engaging said third tube.

5. The telescoping tube assembly according to claim 4, further comprising a coupler stop tube positioned adjacent said second end of said coupler tube and in circumferentially surrounding relation to said third tube.

6. The telescoping wand assembly according to claim 5, wherein said coupler tube is positioned in fluid communication with said third tube.

7. The telescoping wand assembly according to claim 5, further comprising a first sealing mechanism positioned in sealed relation between said coupler tube and said second tube in a position adjacent said first end of said coupler tube.

8. The telescoping wand assembly according to claim 7, further comprising a second sealing mechanism positioned between said coupler tube and said second tube in spaced relation to said first sealing mechanism.

9. The telescoping wand assembly according to claim 4, further comprising a tube lock that includes a tang defined by at least one longitudinally extending slot formed through said tube lock, said at least one longitudinally extending slot being positioned in communication with said first tube and said third tube.

10. The telescoping wand assembly according to claim 1, wherein said gap is annular in cross-section.

11. The telescoping wand assembly according to claim 1, wherein said gap is square in cross-section.

12. The telescoping wand assembly according to claim 1, wherein said valve assembly, said first tube, and said second tube each are movable along said longitudinal axis between fully retracted and fully extended positions.

13. The telescoping wand assembly according to claim 12, further comprising a first position lock integrated with said tubular handle, wherein said valve assembly engages said first position lock when in its said fully retracted position.

14. The telescoping wand assembly according to claim 13, further comprising a second position lock integrated with said tubular handle, wherein said valve assembly engages said second position lock when in its said fully extended position.

* * * * *